United States Patent [19]
Loughner

[11] 3,876,295
[45] Apr. 8, 1975

[54] AUXILIARY CLIP-ON EYE PROTECTORS

[75] Inventor: Larry G. Loughner, Andover, Mass.

[73] Assignee: American Optical Corporation, Southbridge, Mass.

[22] Filed: Feb. 27, 1974

[21] Appl. No.: 446,256

[52] U.S. Cl............................ 351/47; 351/48;57;58
[51] Int. Cl. ........................ G02c 9/04; G02c 7/08
[58] Field of Search........... 351/47, 48, 57, 58; 2/13

[56] References Cited
UNITED STATES PATENTS 3,413,057  11/1968  Carmichael...................... 351/47 X
3,531,188  9/1970  Lehlane et al. ..................... 351/48

*Primary Examiner*—Paul A. Sacher
*Attorney, Agent, or Firm*—H. R. Berkenstock, Jr.; William C. Nealon

[57] ABSTRACT

An assembly of auxiliary lenses which can be clipped onto a wearer's primary spectacles and selectively pivoted into and out of a position of use over the lenses of the primary spectacles.

8 Claims, 5 Drawing Figures

3,876,295

AUXILIARY CLIP-ON EYE PROTECTORS

BACKGROUND OF THE INVENTION

1. Field of the Invention

This invention relates to auxiliary eye protectors which are removably attachable to a wearer's primary spectacles and has particular reference to eye shields which may be pivotably lowered and raised respectively toward and away from lenses of the primary spectacles, as desired.

2. Description of the Prior Art

Auxiliary eye protectors of the aforementioned type are commonly referred to as "flip-ups" and have heretofore embodied overly complex constructions each requiring the costly fabrication and tedious assembly of many separate components. In addition to high manufacturing costs, the resulting ungainliness of assemblies of the usual multiplicity of components tends to render such structures highly susceptible to malfunction and/or breakage.

Accordingly, a principal object of the present invention is to overcome the aforementioned and related drawbacks of prior art auxiliary flip-up eye protectors by providing a greatly simplified flip-up construction comprised of an absolute minimum of component parts resulting in a corresponding minification of end product malfunction and improved aesthetics. This reduction in the number of parts also lessens assembly time and overall manufacturing cost thereby offering the possibility of greater production output and market availability at a lower consumer cost per item.

SUMMARY OF THE INVENTION

The aforementioned objective and its corollaries are accomplished according to the present invention through the provision of a novel two-part lens supporting flip-up structure. A stamped or otherwise preformed flat piece of thin and resilient material, preferably sheet metal, is bent into the form of a unit having a pair of clips for attaching the intended flip-up structure to primary spectacles, a finger engaging portion to facilitate handling of the flip-up structure and a bridge clamping arm with which this component of the flip-up is clamped to a lens supporting bridge. The bridge which forms the second part of the two-part structure comprises a rod adapted to receive an auxiliary lens at each of its opposite ends and has intermediate caming portions against which the first mentioned component is rotatably held by its clamping arm for detenting the flip-up into preselected positions forwardly of and away from the lenses of a wearer's primary spectacles when the flip-up (auxiliary eye protector) is in use.

The invention will be more fully understood by reference to the following detailed description when taken in conjunction with the accompanying drawings.

IN THE DRAWINGS

DESCRIPTION OF THE PREFERRED EMBODIMENTS

Figure 1:
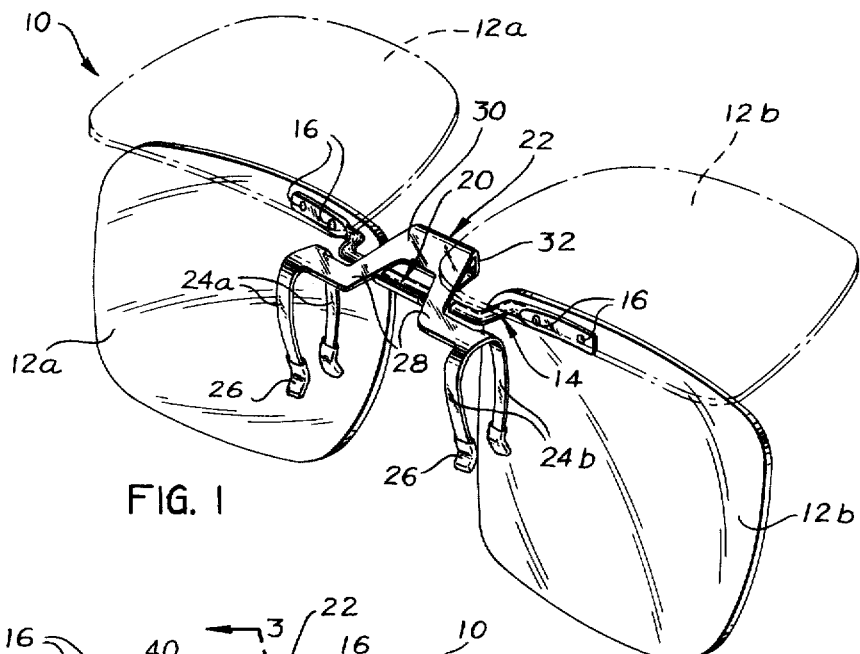
FIG. 1 is a rear view, in perspective, of a preferred embodiment of the invention.
Figure 2:
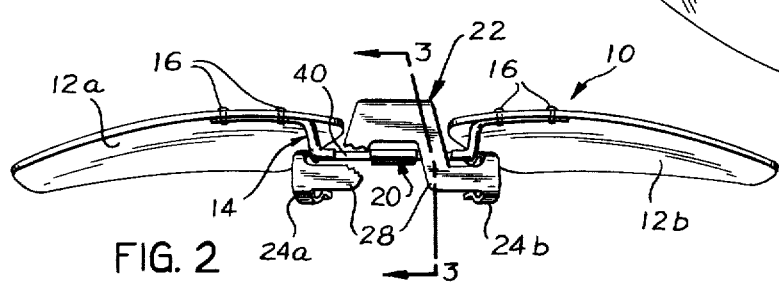
FIG. 2 is a top plan view of the auxiliary eye protector, a small portion of which is broken away to illustrate its underlying structure.
Figure 4:
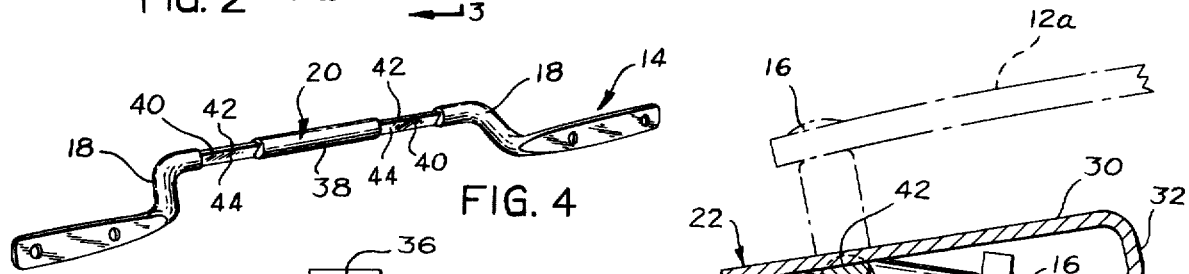
FIG. 4 is a view, in front perspective, of the bridge element of the embodiment of the invention illustrated in FIGS. 1–3.

Referring more particularly to FIGS. 1 and 2 of the drawings, it will be seen that auxiliary eye protector 10 comprises a two-part lens supporting structure wherein lenses 12a and 12b are riveted to bridge 14. In the presently illustrated embodiment of the invention, opposite ends of bridge 14 are flattened and drilled or pierced to receive lens securing rivets 16. It should be understood, however, that lenses 12a and 12b may be cemented, snapped or otherwise attached to bridge 14, if desired.

Bridge 14, which comprises one component of the aforesaid two-part lens supporting structure, is provided with S-shaped bends 18 which produce a setback section 20 adapted to pivotally receive the second component 22 of eye protector 10.

Figure 5:
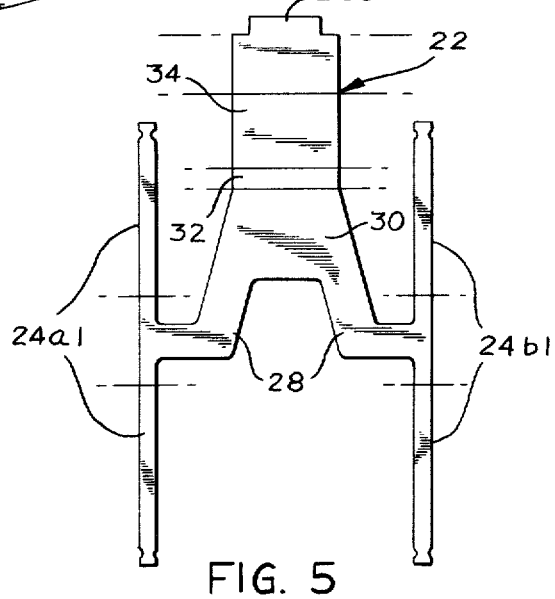
FIG. 5 is a plan view of a flat preform from which a second element of the structure shown in FIGS. 1–3 is produced.

Component 22 is preferably formed of a single piece of thin, resilient sheet material, preferably metal, which is stamped or otherwise cut to the configuration shown in FIG. 5 and thence bent, e.g. with suitably forming dies, into its final configuration. Component 22 may, within the scope of this invention, be injection molded or otherwise formed to the configuration shown and described herein.

Component 22 in finished form comprises a pair of laterally spaced inverted U-shaped clips 24a and 24b which are formed of extensions $24a_1$ and $24b_1$ of the flat preform illustrated in FIG. 5. Clips 24a and 24b are tipped with coverings 26 of plastic, fabric or flocking to prevent scratching of a wearer's primary spectacles when the auxiliary eye protector 10 is applied thereto as will be described shortly.

Legs 28 of component 22 extend forwardly from clips 24a and 24b in back-to-back L-shaped fashion to finger-gripping section 30 wherewith the eye protector may be readily handled with a person's index finger and thumb, one placed over and the other beneath section 30. Section 30 is terminated with a reverse bend 32 and the remaining portion of component 22 is continued rearwardly as clamping arm 34 having its free end provided with a cylindrically shaped bearing portion 36.

Arm 34 of component 22 is spring-biased upwardly toward section 30 and bridge 14 is frictionally journaled in bearing portion 36. This assembly of bridge 14 and component 22 may be made simply by urging arm 34 slightly downwardly away from section 30 and snapping the centermost section 38 of bridge 14 into bearing portion 36.

As mentioned hereinabove, the sheet metal stamping from which component 22 is formed may be initially of a highly resilient material or, after final shaping of component 22 to the general configuration shown in FIGS. 1, 2 and 3, the component may be tempered to enhance the upwardly directed spring tensioning of arm 34 and/or the resiliency of the inverted U-shaped clips 24a and 24b.

In one embodiment of the invention (not shown), the entire portion of bridge 14 extending between its S-shaped bends 18 may be uniformly circular in cross section wherewith bridge 14 and lenses 12a and 12b carried thereby may be rotated as a unit within bearing portion 36 of component 22 and frictionally held at any preselected set position of such adjustment by the tension of spring arm 34 thereagainst. Preferably, however, bridge 14 is provided with detenting cams 40 at either side of the centermost portion 38.

Cams 40 which are cut, stamped or machined into bridge 14 each have a pair of adjoining flat faces 42 and 44. They are engaged by legs 28 of component 22 which, in turn, are held firmly thereagainst by the spring tension of arm 34 tending to pull section 30 and legs 28 downwardly toward bearing portion 36.

Figure 3:
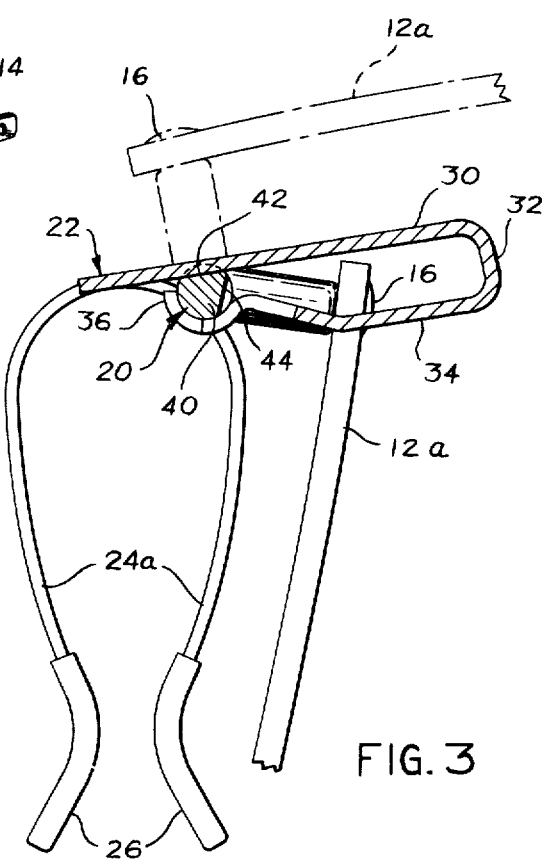
FIG. 3 is an enlarged vertical cross-sectional view taken generally along line 3—3 of FIG. 2 looking in the direction of the arrows.

With flats 42 of cams 40 resting squarely against the undersurfaces of legs 28, bridge 14 and lenses 12a and 12b become detented into a preestablished position where lenses 12a and 12b are directed downwardly generally parallel to the downward extension of U-shaped clips 24a and 24b as shown with full line illustration FIGS. 1, 2 and 3. By manually overriding this detented position of the bridge, i.e. by manually flipping lenses 12a and 12b upwardly until flats 44 of cams 40 assume a position squarely against legs 28 of component 22, the bridge 14 and lenses 12a, and 12b become releasably detented in the raised position which is illustrated in FIGS. 1 and 3 with broken lines.

When the auxiliary eye protector 10 of the present invention is attached to a wearer's primary spectacles with clips 24a and 24b in the usual fashion, the detented position of bridge 14 and lenses 12a, and 12b carried thereby which is shown by full line illustration in FIGS. 1, 2 and 3 positions lenses 12a and 12b directly forwardly of and generally parallel to the right and left eye lenses respectively of the wearer's primary spectacles. With bridge 14 and lenses 12a, and 12b rotated to the position illustrated by broken lines in FIGS. 1 and 3, however, the lenses 12a, and 12b become positioned above and away from the wearer's primary spectacle lenses. While the angle subtended by surfaces 42 and 44 of cams 40 (see FIG. 3) is illustrated as being less than a right angle, it may be as much as 90° or greater if desired for alteration of relative detented positions of bridge 14 in component 22.

Those interested in details of the manner in which flip-up auxiliary eye protectors may be attached to a wearer's primary spectacles may refer to either of U.S. Pat. Nos. 3,413,057 and 3,531,188.

From the foregoing description it can be seen that the auxiliary eye protector of the present invention is comprised of an obsolute minimum of component parts wherewith its unique construction minimizes breakage and malfunction during use, reduces manufacturing cost and enhances end product aesthetics.

I claim:

1. An auxiliary lens supporting structure comprising a bridge adapted to receive and support a lens at each of its opposite ends and a second member about which said bridge is pivotable, said second member comprising the unitary structure of a pair of spaced U-shaped clips, a finger gripping section intermediately of said clips and extending away therefrom, said section being terminated with a reverse bend and having a bridge clamping arm extending from said reverse bend generally toward said U-shaped clips, said clamping arm being resiliently biased toward said finger gripping section and terminating with a bearing portion for pivotally clamping said second member to said bridge intermediately of the opposite ends of said bridge whereby the bridge may be selectively manually pivoted relative to said second member for bringing lenses supported thereby into preselected differently oriented relationship with respect to a given position of said second member.

2. An auxiliary lens supporting structure according to claim 1 wherein said bridge is provided with at least one cam section intermediately of said opposite ends thereof and a portion of said finger gripping section of said second member is resiliently clamped against said cam section by said clamping arm.

3. An auxiliary lens supporting structure according to claim 1 wherein said bridge has a centrally disposed portion of circular cross-sectional configuration against which said bearing portion of said clamping arm is seated for pivotally connecting said second member to said bridge.

4. An auxiliary lens supporting structure according to claim 3 wherein said bridge further includes a cam section adjacent each of opposite ends of said central portion of circular cross-sectional configuration, said finger gripping section of said second member having a pair of legs one of each engaging one of said cam sections and said clamping arm resiliently urging said legs of said finger gripping section against said cam sections whereby said bridge may be pivotally detented into preselected positions of differently oriented relationships with respect to said given position of said second member.

5. An auxiliary eye protector for attachment to a wearer's primary sepctacles comprising a bridge having a lens attached to each of its opposite ends, a second member about which said bridge is pivotable, said second member comprising the unitary structure of a pair of laterally spaced inverted U-shaped clips, a forwardly directed finger gripping section terminated with a reverse bend and having a clamping arm extending rearwardly from said reverse bend, said clamping arm being resiliently biased upwardly toward said finger gripping section and itself terminating with a bearing portion for pivotally clamping said second member to said bridge member intermediately of said lenses whereby, with said bridge member so journaled in said bearing portion, said lenses may be selectively manually pivoted in unison toward and away from a position in front of said primary spectacles when said auxiliary eye protector is attached to such spectacles with said U-shaped clips.

6. An auxiliary eye protector according to claim 5 wherein said bridge is provided with at least one cam section intermediately of said opposite ends thereof and a portion of said finger gripping section of said second member is resiliently clamped against said cam section by said clamping arm.

7. An auxiliary eye protector according to claim 5 wherein said bridge has a centrally disposed portion of circular cross-sectional configuration against which said bearing portion of said clamping arm is seated for pivotally connecting said second member to said bridge.

8. An auxiliary eye protector according to claim 7 wherein said bridge further includes a cam section adjacent each of opposite ends of said central portion of circular cross-sectional configuration, said finger gripping section of said second member having a pair of legs, one of each engaging one of said cam sections and said clamping arm resiliently urging said legs of said finger gripping section against said cam sections whereby said bridge may be pivotally detented into preselected positions of differently oriented relationships with respect to said given position of said second member.

* * * * *